US006458250B1

(12) United States Patent
Holliday et al.

(10) Patent No.: US 6,458,250 B1
(45) Date of Patent: Oct. 1, 2002

(54) PROCESS FOR THE APPLICATION OF POWDER COATINGS TO NON-METALLIC SUBSTRATES

(75) Inventors: Martin L. Holliday, Richmond; Craig Wilson, Birmingham; Colin G. Piearce, Birminghan, all of (GB)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/697,997

(22) Filed: Oct. 26, 2000

(51) Int. Cl.[7] ................................................ B01J 19/08
(52) U.S. Cl. ........................................ 204/164; 427/475
(58) Field of Search ........................... 204/164; 427/475

(56) References Cited

U.S. PATENT DOCUMENTS

| | | | | | |
|---|---|---|---|---|---|
| 5,639,560 | A | | 6/1997 | Moens et al. | |
| 5,824,373 | A | * | 10/1998 | Biller et al. | 427/474 |
| 6,214,421 | B1 | * | 4/2001 | Pidzarko | 427/475 |
| 6,280,524 | B1 | * | 8/2001 | Lin et al. | 427/157 |

FOREIGN PATENT DOCUMENTS

| | | | |
|---|---|---|---|
| DE | 19533858 | A1 | 7/1997 |
| EP | 0636660 | A2 | 2/1995 |
| EP | 0702067 | A2 | 3/1996 |
| EP | 0933140 | A1 | 8/1999 |
| WO | WO 99/41323 | | 8/1999 |

OTHER PUBLICATIONS

H. Bauch, JOT 1998, vol. 10, pp. 40–51.

* cited by examiner

*Primary Examiner*—Kishor Mayekar
(74) *Attorney, Agent, or Firm*—Steven C. Benjamin

(57) ABSTRACT

The present invention describes a process for the application of a powder coating to a non-conductive substrate by first exposing the non conductive substrate to a combination of steam and heat at temperatures between 70° C. and 140° C. for a period between 5 seconds and up to 10 minutes, followed by electrostatic application of a powder coating to the substrate which is grounded; this simple and reliable pre-treatment method allows an efficient application of powder coatings to non-conductive substrates resulting in uniform and even deposition of the powder coating over the whole surface including edges and with no adverse effects on the subsequent curing of the powder film.

7 Claims, No Drawings

PROCESS FOR THE APPLICATION OF POWDER COATINGS TO NON-METALLIC SUBSTRATES

BACKGROUND OF THE INVENTION

This invention relates to a process for the application of powder coatings to non-metallic substrates such as wood or plastics, plaster and cement based products, and composite materials, preferably medium density fibre board (MDF) or other cellulose based substrates.

Powder coatings are typically applied to electrically conductive metal substrates. The deposition of the powder coating on these electrically conductive materials is enhanced by electrostatic forces. The powder is charged by means of friction (Triboelectric charging) or by corona discharge. The charged powder is then sprayed onto a substrate that is grounded. The electrostatic charge on particles of the powder coating, allows the application of an even powder layer on the substrate and also results in a temporary adhesion of the powder to the substrate surface. This adhesion is fairly strong and allows for transport of the coated pieces from the powder application area to the curing oven where the powder is melted and forms a continuous film on the substrate. The conductivity of metal substrates is important for the success of powder coatings.

The use of powder coatings to coat non-metallic substrates is environmentally advantageous in order to reduce VOC (volatile organic compound) emissions and coating waste. However, the application onto essentially non-conductive substrates is much more difficult to accomplish than onto metallic substrates. The surface conductivity of most non-metallic materials like wood composite materials or plastics is not sufficient to allow efficient grounding of the substrate. Powder deposition on these substrates is therefore not assisted by electrostatic attraction that often results in uneven powder deposition and poor adhesion of the powder to the substrate prior to curing of the applied powder coating.

Different routes have been explored in the past to overcome this problem.

The article "Powder Coatings of Wood based Substrates" (H. Bauch, JOT 1998, Vol. 10, p. 40ff) describes the pre-treatment with a liquid conductive primer prior to the application of powder. This primer increases the surface conductivity sufficiently to allow an electrostatic deposition of a powder topcoat. This process, however, requires an additional coating step, possibly with intermediate sanding between primer application and the powder coating process that adds significant cost to the overall coating process.

In the same article other proposals for pre-treatment of non-conductive substrates are suggested such as increasing the surface conductivity by drying it via high frequency alternating voltage or using UV (ultraviolet light) curing powder coats without surface pre-treatment. The problems are to get uniform coatings particularly for structural substrates and to obtain coatings with the desired hiding power or matting properties.

DE-A 19533858 describes the preheating of MDF boards with microwaves prior to the application of a powder coating. It is believed that the microwave heating results in a temporary increase of the moisture content on the surface of the MDF which reduces the surface resistivity. However, the heating of large objects like MDF boards with microwaves is expensive and it is difficult to accomplish even heating of such large objects with microwaves.

Another process that has been used is spraying the surface of nonmetallic substrates with water prior to coating to increase surface conductivity. The problem with this approach is the formation of water vapor under the powder film during the melting/curing process causing porosity and poor powder adhesion.

Another known pre-treatment method consists of exposing a non-conductive substrate like wood composites or natural wood to dry heat and then applying the powder onto the hot surface. EP-A 933140 for instance describes the use of infra red radiation to pre-heat the board. The powder is then applied to the board having a particular surface temperature (e.g. 55° C.). This process has the disadvantage that the edges of the boards are often not covered sufficiently due to heat loss.

The novel process of this invention overcomes the aforementioned deficiencies of the prior art processes.

SUMMARY OF THE INVENTION

This invention is directed to a process for the application of powder coatings to a non-conductive substrate by first treating the substrate with steam and heat prior to the electrostatic application of a powder coating. This simple and reliable pre-treatment method allows for the efficient application of powder coatings to non-conductive substrates with even deposition over the whole surface including edges and with no adverse effects on the subsequent curing of the powder film.

DETAILED DESCRIPTION OF THE INVENTION

In the process of this invention, the surface of a non-conductive substrate is exposed to a combination of steam and heat at temperatures between 70° C. and 140° C. for a period between 5 seconds and up to 10 minutes, followed by electrostatic application of a powder coating material to the substrate which is grounded.

Preferably pre-treating temperatures between 80° C. and 130° C. and a pre-treating period between 5 seconds and 5 minutes are used.

The close control of temperature and time parameters of the steam pre-treatment and heat depending on the substrate being treated is necessary to avoid the possibility of water evolution through the powder film during the melting/curing process which leads to film defects such as pinholes or blisters.

It is essential in the process of this invention to apply the combination of steam and heat so that the treated surface does not become saturated or have condensation on the surface.

The substrate to be coated by the process according to the invention is placed into a saturated atmosphere of steam at the above mentioned temperatures for the above mentioned time period.

The steam chamber can be heated externally to maintain its inside temperature.

It is also possible to apply high pressure steam at a suitable temperature to adjust the temperature to the desired value. The steam treatment can also be accomplished by passing the pieces to be coated in front of steam nozzles which are designed to cover the total surface area of the pieces evenly.

After the steam and heat pre-treatment, a powder coating is applied to the substrate that is grounded. The temperature of the substrate surface during the powder application can be between room temperature and 90° C. It is preferred to apply the powder at a temperature below the glass transition temperature of the powder coating material. Typical powder coating glass transition temperatures are between 45 and 70° C.

After the steam and heat pre-treatment and before powder application to the substrate surface, a stabilization period between 5 seconds and up to 5 minutes is preferred, for example a period of 30 seconds to 1 minute.

The powder coating material used for the process according to the invention can be any thermal curing or radiation curing powder that is suitable for the substrate in question, comprising the known powder binders, cross-linking agents, pigments and/or additives. The resulting coating can be for instance a smooth finish, a textured finish or a metallic effect.

Examples of powder coating compositions that can be cured with UV-radiation are described in EP-A 739922, EP-A 702067 or EP-A 636660.

Powder coating compositions that are suitable for being cured by means of near infra red (NIR) radiation are described in WO 99/41323.

After the powder coating application step, the coating powder material is melted and cured by suitable means. For the melting step, convection heat, radiant heat (e.g. infra red, gas catalytic infra red, near infra red (NIR) radiation) or combinations of different heat sources can be used. If thermal curing powder coatings are employed, the same heat source can be used to accomplish the curing step. If UV or electron beam curing powder coatings are used, the curing can be accomplished by irradiation of the molten layer with UV-radiation or by electron beam treatment.

The process according to the invention can be applied to various non-conductive substrates like particle board, MDF, HDF (high density fibre), paper, cardboard or other cellulosic based materials, natural wood plastics, plaster or cement based materials and composite materials.

The process according to the invention is especially useful for the coating of thin MDF-boards with a thickness below 15 mm which may contain profiles that have been cut out with sharp edges. Such boards are difficult to coat using the known pre-treatment methods like dry heat.

The process according to the invention allows an efficient application of coating powders to non-conductive substrates with a very reproducible and uniform deposition of the powder on the substrate and optimal flow and hiding power qualities.

The steam plus heat pre-treatment allows an even application of powders on all parts of the substrate including mouldings, sharp edges or edges of holes. The pre-treatment does not interfere with the subsequent melting of the powder layer and the curing process. Essentially defect free coatings with a good quality are obtained.

The following examples further demonstrate the process of this invention. In each of the following examples, an epoxy polyester powder coating was used and applied by Corona applications using conventional applications conditions and the substrate to which the powder was applied was grounded.

EXAMPLES

Example 1

A MDF board of 6 mm thickness was conditioned by being passed through a chamber where it was exposed to steam and circulated air heated to 80° C., for one minute. After exiting the chamber the board was left to stabilize for one minute before powder coating using a conventional high voltage electrostatic spray gun. Powder application was excellent including full coverage of the board edges and wrap around to the rear of the board.

Example 2

Another piece of the same board was coated in the same manner but without the steam-heat conditioning stage. Powder application was poor, in particular it was not possible to achieve coverage on the edges of the board, and wrap around was limited.

Example 3

Another piece of the same board was preheated by infrared radiation to a surface temperature of 80° C., then powder coated as above within 1 minute. The powder did not adhere to the edges of the board.

Example 4

A pre-assembled 3-dimensional box measuring 300×150 mm of 15 mm MDF boards was powder coated without any conditioning of the box and also another box, described above, was powder coated after preheating of the box in a convection oven for 5 minutes at 130° C. In both cases, penetration of the powder coating into the corners of the boxes was poor with significant areas uncoated.

Example 5

A box as described in Example 4 was passed through a chamber where it was exposed to steam and heat at 85° C. for one minute. After removal from the chamber and stabilization for one minute, it was powder coated as above; this time, the application of powder was excellent with full coverage internally and externally.

What is claimed is:

1. A process for the application of a powder coating to a non-conductive substrate, which comprises treating a surface of the non-conductive substrate with steam and heat at temperatures between 70° C. and 140° C. for a time period between 5 seconds and up to 10 minutes; stabilizing the treated surface for a stabilization period; and subsequently applying a powder coating by electrostatic spraying application of the powder coating to the stabilized surface.

2. The process according to claim 1 wherein the steam and heat temperatures are between 80° C. and 130° C. and the time period is between 5 seconds and 5 minutes.

3. The process according to claim 1 wherein the stabilization period is between 5 seconds and up to 5 minutes.

4. The process according to claim 1 wherein the stabilization period is between 30 seconds and up to 1 minute.

5. The process according to claim 1 wherein the substrate to be treated is placed into a saturated atmosphere of steam followed by circulated hot air.

6. The process according to claim 1 wherein the temperature of the substrate surface during the powder application is maintained between room temperature and 90° C.

7. The process according to claim 1 wherein the temperature of the substrate surface during the application of the powder coating is between 45 and 70° C. and below the glass transition temperature of the powder coating.

* * * * *